(12) United States Patent
Helferich

(10) Patent No.: US 7,146,157 B2
(45) Date of Patent: *Dec. 5, 2006

(54) SYSTEMS AND METHODS FOR DOWNLOADING AUDIO INFORMATION TO A MOBILE DEVICE

(75) Inventor: Richard J. Helferich, 1439 Lauren Ct., Encinitas, CA (US) 92024

(73) Assignees: Richard J. Helferich, Encinitas, CA (US); Thompson Investment Group, LLC, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/108,759

(22) Filed: Apr. 19, 2005

(65) Prior Publication Data

US 2005/0181770 A1 Aug. 18, 2005

Related U.S. Application Data

(63) Continuation of application No. 09/513,998, filed on Feb. 23, 2000, now Pat. No. 6,983,138, which is a continuation of application No. 08/989,874, filed on Dec. 12, 1997, now Pat. No. 6,097,941.

(51) Int. Cl.
*H04L 12/58* (2006.01)
(52) U.S. Cl. ............... 455/412.1; 455/412.2; 455/414.2
(58) Field of Classification Search ............ 455/412.1, 455/412.2, 550.1, 404, 413, 418, 414.1, 422.1, 455/414.2, 414.4; 709/209; 705/51
See application file for complete search history.

(56) References Cited

U.S. PATENT DOCUMENTS 3,118,145 A   1/1964  Nee
4,480,253 A  10/1984  Anderson
4,644,352 A   2/1987  Fujii
4,737,979 A   4/1988  Hashimoto
H610      H   3/1989  Focarile et al.
4,812,843 A   3/1989  Champion, III et al.
4,821,308 A   4/1989  Hashimoto
4,825,456 A   4/1989  Rosenberg
4,845,491 A   7/1989  Fascenda et al.
4,853,688 A   8/1989  Andros et al.

(Continued)

FOREIGN PATENT DOCUMENTS

EP      631419     12/1994

(Continued)

OTHER PUBLICATIONS

Khare, R., et al., "Scenarios for an Internet-Scale Event Notification Service (ISENS)", Internet-Draft, Aug. 13, 1998, 18 pages.

(Continued)

*Primary Examiner*—Matthew D. Anderson
*Assistant Examiner*—Tan Trinh
(74) *Attorney, Agent, or Firm*—Rothwell, Figg, Ernst & Manbeck

(57) ABSTRACT

Devices, systems and processes for accessing and management of voice and other messages. Such devices, systems and processes employ an interface which allows the user to access and manage messages on his or her user device and, furthermore, automatically to access and manage messages on remote devices via radio frequency link. These interfaces may present users with intuitive and direct options for accessing and managing voice mail, such as, for instance, to push a designated forward button when the user desires to forward a voice mail. Such common interfaces promote more efficient and effective use and management of messaging resources because they among other things eliminate the requirement to be conversant in different interfaces, rules and protocols for the different platforms on which messages may be accessed and managed.

17 Claims, 9 Drawing Sheets

U.S. PATENT DOCUMENTS

| | | |
|---|---|---|
| 4,868,560 A | 9/1989 | Oliwa et al. |
| 4,897,835 A | 1/1990 | Gaskill et al. |
| 4,942,598 A | 7/1990 | Davis |
| 4,961,216 A | 10/1990 | Baehr et al. |
| 4,965,569 A | 10/1990 | Bennett et al. |
| 4,975,694 A | 12/1990 | McLaughlin et al. |
| 5,003,576 A | 3/1991 | Helferich |
| 5,005,013 A | 4/1991 | Tsukamoto et al. |
| 5,007,105 A | 4/1991 | Kudoh et al. |
| 5,029,199 A | 7/1991 | Jones et al. |
| 5,040,204 A | 8/1991 | Sasaki et al. |
| 5,043,721 A | 8/1991 | May |
| 5,047,763 A | 9/1991 | Kuznicki et al. |
| 5,065,423 A | 11/1991 | Gaskill |
| 5,070,536 A | 12/1991 | Mahany et al. |
| 5,093,659 A | 3/1992 | Yamada |
| 5,115,233 A | 5/1992 | Zdunek et al. |
| 5,117,449 A | 5/1992 | Metroka et al. |
| 5,128,980 A | 7/1992 | Choi |
| 5,128,981 A | 7/1992 | Tsukamoto et al. |
| 5,134,724 A | 7/1992 | Gehring et al. |
| 5,138,311 A | 8/1992 | Weinberg |
| 5,138,312 A | 8/1992 | Tsukamoto et al. |
| 5,140,419 A | 8/1992 | Galumbeck et al. |
| 5,146,612 A | 9/1992 | Grosjean et al. |
| 5,153,903 A | 10/1992 | Eastmond et al. |
| 5,159,331 A | 10/1992 | Park et al. |
| 5,159,713 A | 10/1992 | Gaskill et al. |
| 5,173,688 A | 12/1992 | DeLuca et al. |
| 5,175,758 A | 12/1992 | Levanto et al. |
| 5,177,780 A | 1/1993 | Kasper et al. |
| 5,182,553 A | 1/1993 | Kung |
| 5,185,604 A | 2/1993 | Nepple et al. |
| 5,192,947 A | 3/1993 | Neustein |
| 5,194,857 A | 3/1993 | Gomez |
| 5,212,636 A | 5/1993 | Nakazawa |
| 5,220,366 A | 6/1993 | King |
| 5,227,774 A | 7/1993 | Benoist |
| 5,239,466 A | 8/1993 | Morgan et al. |
| 5,239,679 A | 8/1993 | Murai |
| 5,241,305 A | 8/1993 | Fascenda et al. |
| 5,247,700 A | 9/1993 | Wohl et al. |
| 5,257,307 A | 10/1993 | Ise |
| 5,265,033 A | 11/1993 | Vajk et al. |
| 5,285,426 A | 2/1994 | Teodoridis |
| 5,315,635 A | 5/1994 | Kane et al. |
| 5,329,501 A | 7/1994 | Meister et al. |
| 5,379,031 A | 1/1995 | Mondrosch et al. |
| 5,396,537 A | 3/1995 | Schwendeman |
| 5,398,021 A | 3/1995 | Moore |
| 5,402,466 A | 3/1995 | Delahanty |
| 5,406,557 A | 4/1995 | Baudoin |
| 5,410,302 A | 4/1995 | Dulaney, III et al. |
| 5,418,835 A | 5/1995 | Frohman et al. |
| 5,426,422 A | 6/1995 | Vanden Heuvel et al. |
| 5,426,594 A | 6/1995 | Wright et al. |
| 5,428,663 A | 6/1995 | Grimes et al. |
| 5,432,839 A | 7/1995 | DeLuca |
| 5,436,960 A | 7/1995 | Campana, Jr. et al. |
| 5,440,559 A | 8/1995 | Gaskill |
| 5,444,671 A | 8/1995 | Tschannen et al. |
| 5,448,759 A | 9/1995 | Krebs et al. |
| 5,452,356 A | 9/1995 | Albert |
| 5,455,579 A | 10/1995 | Bennett et al. |
| 5,455,823 A | 10/1995 | Noreen et al. |
| 5,457,732 A | 10/1995 | Goldberg |
| 5,463,672 A | 10/1995 | Kage |
| 5,473,143 A | 12/1995 | Vak et al. |
| 5,473,667 A | 12/1995 | Neustein |
| 5,475,653 A | 12/1995 | Yamada et al. |
| 5,479,378 A | 12/1995 | Yamada et al. |
| 5,479,408 A | 12/1995 | Will |
| 5,479,472 A | 12/1995 | Campana, Jr. et al. |
| 5,481,255 A | 1/1996 | Albert et al. |
| 5,483,352 A | 1/1996 | Fukuyama et al. |
| 5,483,595 A | 1/1996 | Owen |
| 5,485,503 A | 1/1996 | Diem |
| 5,487,100 A | 1/1996 | Kane |
| 5,489,894 A | 2/1996 | Murray |
| 5,497,373 A | 3/1996 | Hulen et al. |
| 5,530,438 A | 6/1996 | Bickham et al. |
| 5,530,930 A | 6/1996 | Hahn |
| 5,550,535 A | 8/1996 | Park |
| 5,555,446 A | 9/1996 | Jasinski |
| 5,557,659 A | 9/1996 | Hyde-Thomson |
| 5,561,702 A | 10/1996 | Lipp et al. |
| 5,564,018 A | 10/1996 | Flores et al. |
| 5,572,196 A | 11/1996 | Sakumoto et al. |
| 5,572,488 A | 11/1996 | Yamada et al. |
| 5,579,372 A | 11/1996 | Astrom |
| 5,581,366 A | 12/1996 | Merchant et al. |
| 5,581,593 A | 12/1996 | Engelke et al. |
| 5,588,009 A | 12/1996 | Will |
| 5,592,532 A | 1/1997 | Koizumi et al. |
| 5,600,703 A | 2/1997 | Dang et al. |
| 5,604,788 A | 2/1997 | Tett |
| 5,608,786 A | 3/1997 | Gordon |
| 5,623,242 A | 4/1997 | Dawson, Jr. et al. |
| 5,627,525 A | 5/1997 | Kudoh et al. |
| 5,630,060 A | 5/1997 | Tang et al. |
| 5,630,207 A | 5/1997 | Gitlin et al. |
| 5,633,916 A | 5/1997 | Goldhagen et al. |
| 5,635,918 A | 6/1997 | Tett |
| 5,638,369 A | 6/1997 | Ayerst et al. |
| 5,644,627 A | 7/1997 | Segal et al. |
| 5,649,305 A | 7/1997 | Yoshida |
| 5,652,789 A | 7/1997 | Miner et al. |
| 5,654,942 A | 8/1997 | Akahane |
| 5,663,703 A | 9/1997 | Pearlman et al. |
| 5,675,507 A | 10/1997 | Bobo, II |
| 5,675,627 A | 10/1997 | Yaker |
| 5,678,179 A | 10/1997 | Turcotte et al. |
| 5,684,859 A | 11/1997 | Chanroo et al. |
| 5,694,120 A | 12/1997 | Indekeu et al. |
| 5,696,500 A | 12/1997 | Diem |
| 5,717,742 A | 2/1998 | Hyde-Thomson |
| 5,724,410 A | 3/1998 | Parvulescu et al. |
| 5,726,643 A | 3/1998 | Tani |
| 5,737,394 A | 4/1998 | Anderson et al. |
| 5,737,395 A | 4/1998 | Irribarren |
| 5,742,668 A | 4/1998 | Pepe et al. |
| 5,745,689 A | 4/1998 | Yeager et al. |
| 5,751,793 A | 5/1998 | Davies et al. |
| 5,761,622 A | 6/1998 | Priest |
| 5,774,803 A | 6/1998 | Kariya |
| 5,781,857 A | 7/1998 | Hwang et al. |
| 5,796,394 A | 8/1998 | Wicks et al. |
| 5,797,091 A * | 8/1998 | Clise et al. .............. 455/404.2 |
| 5,802,466 A | 9/1998 | Gallant et al. |
| 5,805,886 A | 9/1998 | Skarbo et al. |
| 5,809,130 A | 9/1998 | Ayala |
| 5,809,415 A | 9/1998 | Rossman |
| 5,812,795 A | 9/1998 | Horovitz et al. |
| 5,815,800 A | 9/1998 | Su et al. |
| 5,828,882 A | 10/1998 | Hinckley |
| 5,835,089 A | 11/1998 | Skarbo et al. |
| 5,838,252 A | 11/1998 | Kikinis |
| 5,850,594 A | 12/1998 | Cannon et al. |
| 5,857,020 A | 1/1999 | Peterson, Jr. |
| 5,870,030 A | 2/1999 | DeLuca et al. |
| 5,870,454 A | 2/1999 | Dahlen |
| 5,872,926 A | 2/1999 | Levac et al. |
| 5,875,436 A | 2/1999 | Kikinis |
| 5,884,159 A | 3/1999 | Thro et al. |

| | | |
|---|---|---|
| 5,892,909 A | 4/1999 | Grasso et al. |
| 5,895,471 A | 4/1999 | King et al. |
| 5,905,495 A | 5/1999 | Tanaka et al. |
| 5,907,805 A | 5/1999 | Chotai |
| 5,913,032 A | 6/1999 | Schwartz et al. |
| 5,938,725 A | 8/1999 | Hara |
| 5,948,059 A | 9/1999 | Woo et al. |
| 5,951,638 A | 9/1999 | Hoss et al. |
| 5,961,590 A | 10/1999 | Mendez et al. |
| 5,961,620 A | 10/1999 | Trent et al. |
| 5,963,618 A | 10/1999 | Porter |
| 5,966,652 A | 10/1999 | Coad et al. |
| 5,974,447 A | 10/1999 | Cannon et al. |
| 6,018,657 A | 1/2000 | Kennedy et al. |
| 6,021,433 A | 2/2000 | Payne et al. |
| 6,032,039 A | 2/2000 | Kaplan |
| 6,047,053 A | 4/2000 | Miner et al. |
| 6,060,997 A | 5/2000 | Taubenheim et al. |
| 6,064,879 A | 5/2000 | Fujiwara et al. |
| 6,087,956 A | 7/2000 | Helferich |
| 6,097,941 A | 8/2000 | Helferich |
| 6,119,167 A | 9/2000 | Boyle et al. |
| 6,138,158 A | 10/2000 | Boyle et al. |
| 6,351,523 B1 | 10/2000 | Boyle et al. |
| 6,233,318 B1 | 5/2001 | Picard et al. |
| 6,233,430 B1 | 5/2001 | Helferich |
| 6,236,804 B1 * | 5/2001 | Tozaki et al. ............... 386/95 |
| 6,253,061 B1 | 6/2001 | Helferich |
| 6,259,892 B1 | 7/2001 | Helferich |
| 6,278,862 B1 | 8/2001 | Henderson |
| 6,292,668 B1 | 9/2001 | Alanara et al. |
| 6,317,594 B1 | 11/2001 | Gossman et al. |
| 6,356,939 B1 | 3/2002 | Dahl |
| 6,370,389 B1 | 4/2002 | Isomursu et al. |
| 6,411,827 B1 | 6/2002 | Minata |
| 6,459,360 B1 | 10/2002 | Helferich |
| 6,462,646 B1 | 10/2002 | Helferich |
| 6,567,179 B1 | 5/2003 | Sato et al. |
| 6,771,949 B1 | 8/2004 | Corliss |
| RE38,787 E * | 8/2005 | Sainton et al. ............... 455/453 |
| 6,983,138 B1 * | 1/2006 | Helferich ................... 455/12.1 |
| 2002/0032658 A1 * | 3/2002 | Oki et al. ..................... 705/51 |

FOREIGN PATENT DOCUMENTS

| | | |
|---|---|---|
| EP | 777394 | 6/1997 |
| EP | 831664 | 9/1997 |
| JP | 6-318899 | 11/1994 |
| JP | 8-228368 | 9/1996 |
| KR | 00164369 | 9/1998 |
| WO | 9965256 | 12/1996 |
| WO | 97/08906 | 3/1997 |
| WO | 9858476 | 12/1998 |

OTHER PUBLICATIONS

Siewiorek, D.P., et al., "Computer Structures: Principles and Examples", McGraw-Hill Book Company, 1982, 21 pages.

"Active Channel Server Frequently Asked Questions (FAQ)", Microsoft Corporation, Q181161, 2006, 2 pages.

Engst, A.C., "TidBITS#349/Oct. 14, 1996," TidBITS Electronic Publishing, 1996, 10 pages.

Engst, A.C., "The Real TidBITS Channel", TidBITS Electronic Publishing, 1998, 4 pages.

"Introduction to Active Channel Technology", Microsoft Corporation, 2006, 5 pages.

Gillay, C.Z., "Subscriptions, Channels, and Active Desktop", TechNotes, Franklin, Beedle & Associates, Inc., 1999, pp. 1-6.

Winnick Cluts, N., et al., "A Preview of Active Channel and the Active Desktop for Internet Explorer 4.0", Microsoft Corporation, 1997, 13 pages.

Form 1449, filed in Patent No. 5,438,611, Campana, Jr. et al., Issued Aug. 1, 1995, 1 page.

* cited by examiner

SYSTEMS AND METHODS FOR DOWNLOADING AUDIO INFORMATION TO A MOBILE DEVICE

This application is a continuation of U.S. patent application Ser. No. 09/513,998, filed on Feb. 23, 2000 (now U.S. Pat. No. 6,983,138), which is a continuation of U.S. patent application Ser. No. 08/989,874, filed on Dec. 12, 1997 (Now U.S. Pat. No. 6,097,941). The contents of the above referenced applications are incorporated herein by this reference.

The present invention relates generally to the field of communication systems, and more particularly to systems for allowing users to access and manage voice and other messages.

BACKGROUND OF THE INVENTION

Recent ubiquity of mobile communications systems and devices increases demand for remote access to and ability to manage voice messages and similar messages, records or files. Conventional remote voice message access generally occurs through mobile telephony devices or through pagers. Such conventional approaches typically require users to master a sophisticated list of commands, rules, procedures and protocols in order to access and manage voice mail even on one platform. For instance, simply to forward a message may require the user to know that the forward command is "73," which should not be confused with the reply all command "74." This command then presents the user with a voice menu which requires time to hear and requires multiple additional keystrokes and commands in order to forward the message. Issues become more tedious and acute in mobile telephony, where users on cellphones who may be driving or in cramped quarters find themselves simply unable to refer to a list of voice mail menu options, and may not have the time required to work through the menu in order to forward the message. Where users maintain an account or mail box on more than one system or provider, they must master multiple sets of such commands, rules, procedures and protocols and the inconvenience and problems intensify. Pagers often do not impose the same level of interface complexity, but for that very reason they typically fail to provide the user an acceptable range of options for accessing and managing voice messages.

Conventional mobile approaches to voice mail access and management present other issues. In conventional mobile telephony systems, users may communicate via analog (for example, cellular) or digital (for example, PCS) link with the platform on which voice messages are stored in order to access messages. Such users typically employ standard dual tone multi frequency (DTMF) key interfaces for communicating with, controlling and managing messages on the voice messaging platforms. Such voice mail access and management sessions require excessive bandwidth, however, because the user must be "on line" (in communication via radio link, or otherwise connected or coupled) with the platform and thus occupying radio spectrum. Such sessions can create additional expense to the user and impose extra load upon the telecommunications infrastructure. Such sessions also impose unnecessary demands on the user unit's power system, upon which radio transmission activities impose a considerable load.

U.S. Reissue Pat. No. 34,976 and its antecedent U.S. Pat. No. 5,003,576 to Helferich et al. (Reissued Jun. 20, 1995 and originally issued Mar. 26, 1991) (which disclosures are incorporated herein by this reference) disclose systems in which voice messages and other messages typically created in analog form may be downloaded to cellular telephones and/or other user units for access and management at least partially to address some of these issues. Although such systems disclosed in those document's contemplate transmission of an analog signal, it would also be desirable to download messages via digital radio link such as those conventionally employed in PCS.

Another paradigm for considering optimal access and management of voice messages is in the context of paging systems. Paging receivers are typically more efficient than cellular or PCS devices in energy consumption and use of spectrum among other reasons because they are in an active mode or transmit mode for shorter periods of time. User available information, however, is limited to vibration, tone, tone and voice or data messages. Conventional paging systems which include voice retrieval typically use analog voice channels for transmission and reception of voice messages. Accordingly, voice paging systems have been proposed which include user devices that can, via radio link, download, digitize and store voice messages for access and management in the user unit. In this regard, see U.S. Pat. No. 5,455,579 to Bennett, et al. issued Oct. 3, 1995 (which disclosure is incorporated herein by this reference). Such systems allow users to access and download voice messages to pagers or pager like devices in batch mode, but do not allow the user to access and manage the voice messages on the platform where they are initially stored (or other remote platforms) in the event that the user wishes to do so.

SUMMARY OF THE INVENTION

According to the present invention, user devices include an interface which allows the user to access and manage voice messages and other information which is stored on the devices as well as on remote devices to which the user devices may be coupled via radio frequency link. Processes according to the present invention employ user input to such interfaces for access and management of messages stored on the user devices and, when such a device is on line with a remote platform at which the user's messages are stored, to provide automatic access and management to messages stored there as well. In the event that the user device is not in communication with the remote platform, processes according to the present invention automatically establish a communications session in order to provide such automatic access and message management.

It is accordingly an object of the present invention to provide a single user interface which allows a user to access and manage voice messages and other information stored in the user's device as well as at, in or on remote devices, platforms or locations.

It is an additional object of the present invention to allow a user to access and manage messages stored on his or her own user device as well as on remote devices using a single interface and an analog or digital radio frequency link.

It is an additional object of the present invention to conserve radio spectrum by enabling efficient access and management of voice messages and other information in a number of locations, on a number of platforms, using a single interface.

It is an additional object of the present invention to allow users to access and manage voice messages and other information from any number of other sources stored in any number of locations without requiring the users to be conversant in different access and management interfaces, procedures, rules and protocols for each platform on which messages or information happen to be stored.

It is an additional object of the present invention to provide user devices which access and manage voice messages in their own memory capacity, but which also access and manage messages at remote sites via radio frequency link with power efficiencies and with spectrum efficiencies more akin to paging networks than the less efficient (from a power point of view and currently from a spectrum point of view) cellular and PCS voice message systems.

It is an additional object of the present invention to provide voice messaging interfaces which feature intuitive and direct commands, such as pushing a designated "forward" button in order to forward a message, and which thus eliminate the need for users to memorize or refer to a list of commands in order to access and manage voice messages.

Other objects, features, and advantages of the present invention will become apparent with respect to the remainder of this document.

DETAILED DESCRIPTION OF THE DRAWINGS

Figure 1:
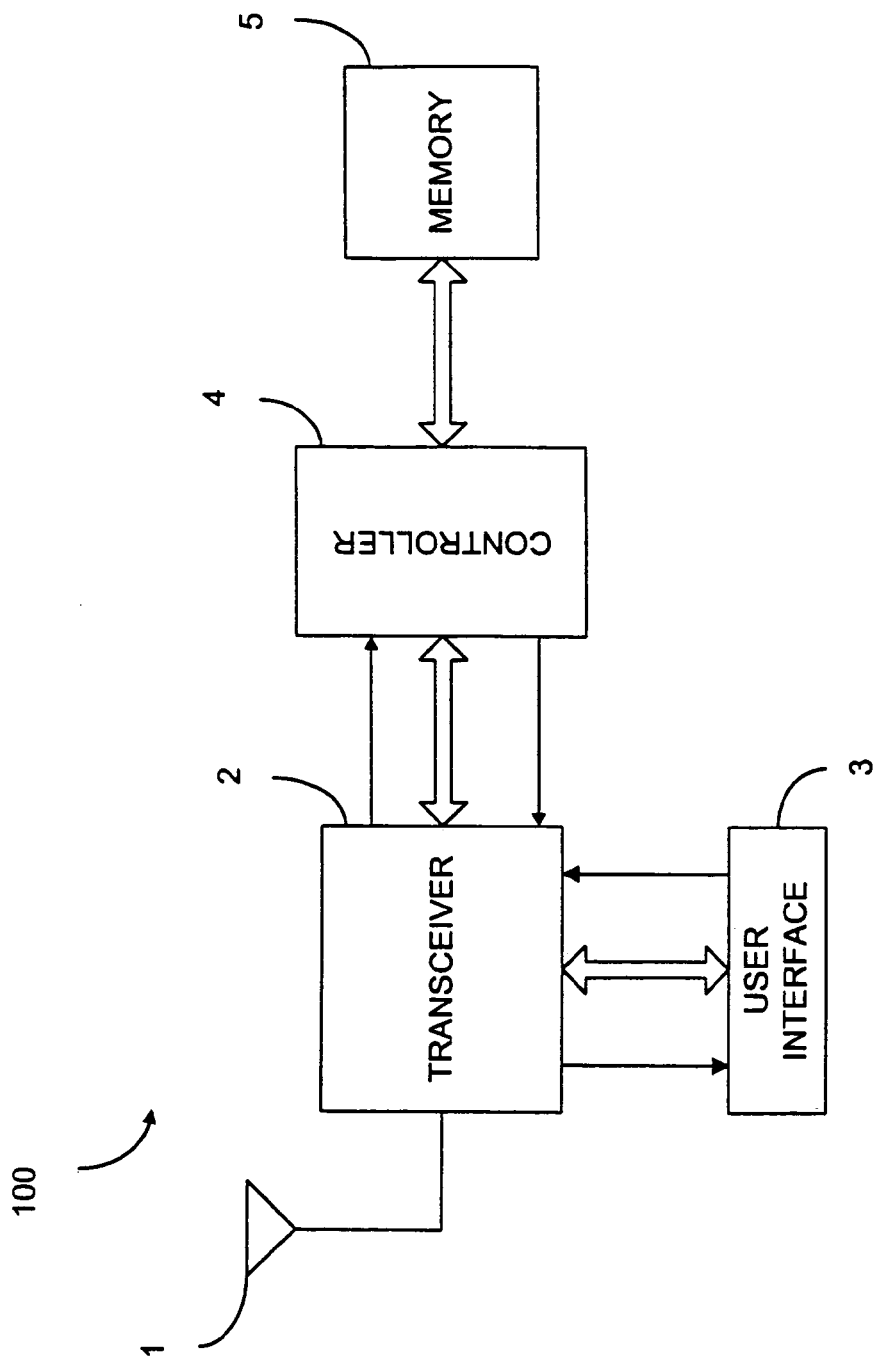
FIG. 1 is a simplified functional block diagram of a user device according to a preferred embodiment of the present invention.

FIG. 1 shows a basic functional block diagram of a paging transceiver 100 according to a preferred embodiment of the present invention. A transmit/receive antenna 1 is connected to transceiver 2 for transmitting and receiving signals such as selective call signals, command data signals and information data signals via conventional radio frequency link. Transceiver 2 may be of any conventional design such as those utilized in two way pagers, mobile radios or portable cellular telephones and similar devices, products or equipment. Transceiver 2 is coupled to a user interface 3 which contains appropriate input and output devices including, for example, a microphone speaker, alert transducer, LED or LCD display, keypad and necessary switches. The user interface 3 may also contain other types of input/output devices depending on the messaging application such as video display, camera, scanner, printer or voice recognition devices, and others. The user interface 3 of the present invention may be of any sort which allows the user to communicate with the transceiver 2. The transceiver 2 is coupled to and communicates with the digital signal processor (DSP) 4. DSP's are conventional in portable cellular transceivers for signal processing purposes. A message memory 5 is coupled to DSP 4 for storing messages. Message memory 5 may be static RAM, Dynamic RAM, Flash RAM, or any type of memory suitable for the messages to be stored and addressed in a manner that allows them to be accessed and managed.

Figure 2:
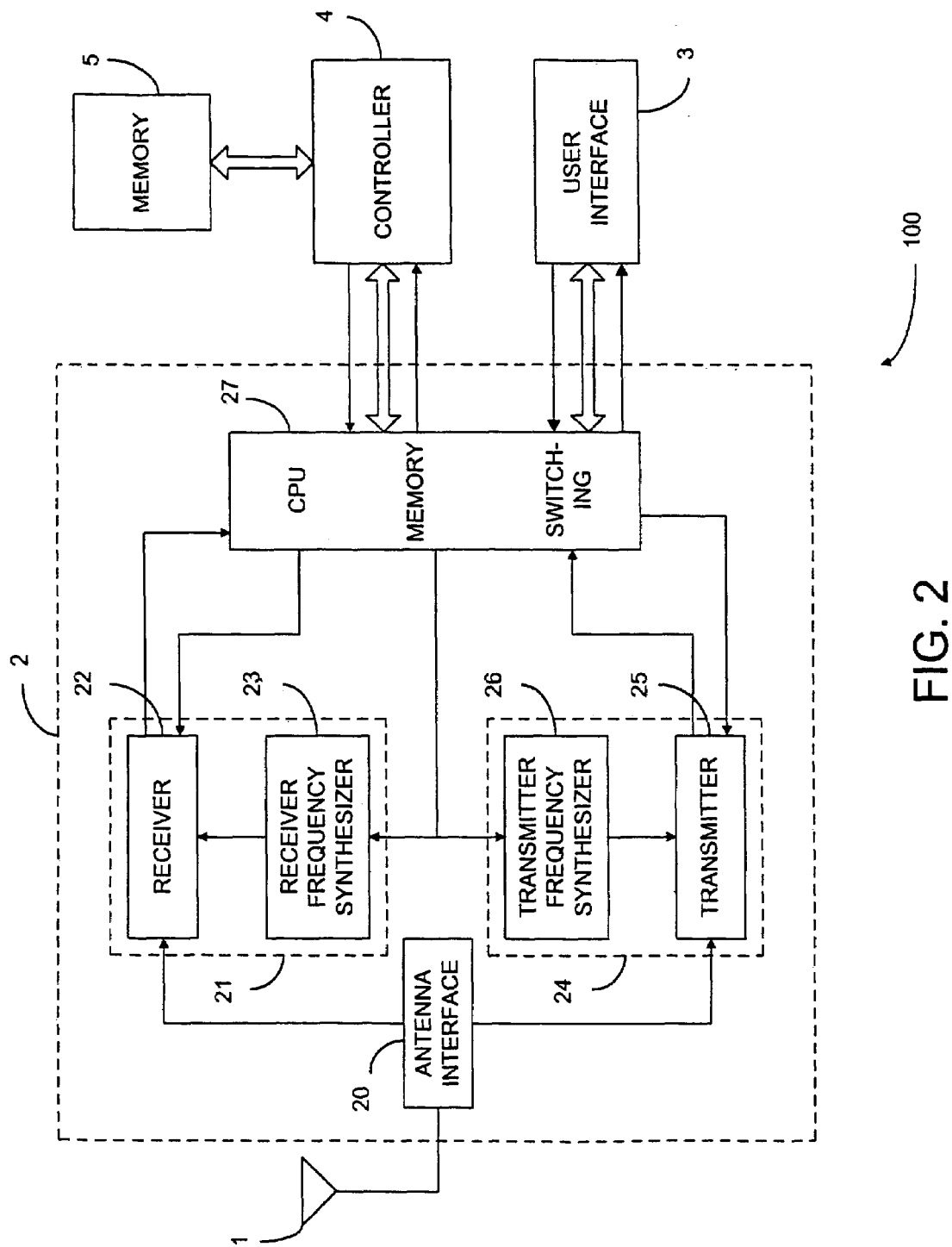
FIG. 2 is a more detailed functional block diagram of a user device according to a preferred embodiment of the present invention.

FIG. 2 shows transceiver 2 in greater detail. An antenna interface 20, for example a conventional cellular duplexer, antenna transmit/receive switch or other device or component or system may be utilized to provide signal isolation and otherwise couple the antenna to the transceiver. Optionally two antennas may be utilized in order to eliminate the antenna interface 20. Antenna interface 20 couples received signals to receiver 22 of receive section 21. Receive frequency synthesizer 23 couples to receiver 22 for selecting the receive frequency. Transmit section 24 comprises a transmitter 25 coupled to antenna interface 20 for transmitting signals using antenna 1. A transmit frequency synthesizer 26 is connected to transmitter 25 for selecting the transmit frequency. A processor chip set or CPU 27 comprises all necessary RAM and ROM memory, signal and data switching circuitry, signal processing circuitry, I-O Ports including all necessary program instructions and stored options commonly utilized in portable cellular telephones. Cellular telephone program instructions and necessary chip set circuitry are conventional and may be obtained from a variety of suppliers.

CPU 27, DSP 4 and other components of devices and systems according to the present invention, if desired, individually and/or collectively contain program instructions and algorithms necessary to process, store and reproduce and otherwise access and manage messages such as voice messages or other messages in connection with the present invention. These instructions and algorithms may, for instance, be stored within a particular DSP for application specific purposes, such as video processing and storage, speech processing and storage, modem signal processing and numerous other types of signal processing applications. Optionally, DSP 4 may be an alternative hardware device such as codec or digital to analog/analog to digital conversion circuit or other type of modulator-demodulator including memory interface circuitry coupled to message memory 5 for reading and writing and other accessing and management of messages.

Figure 3:
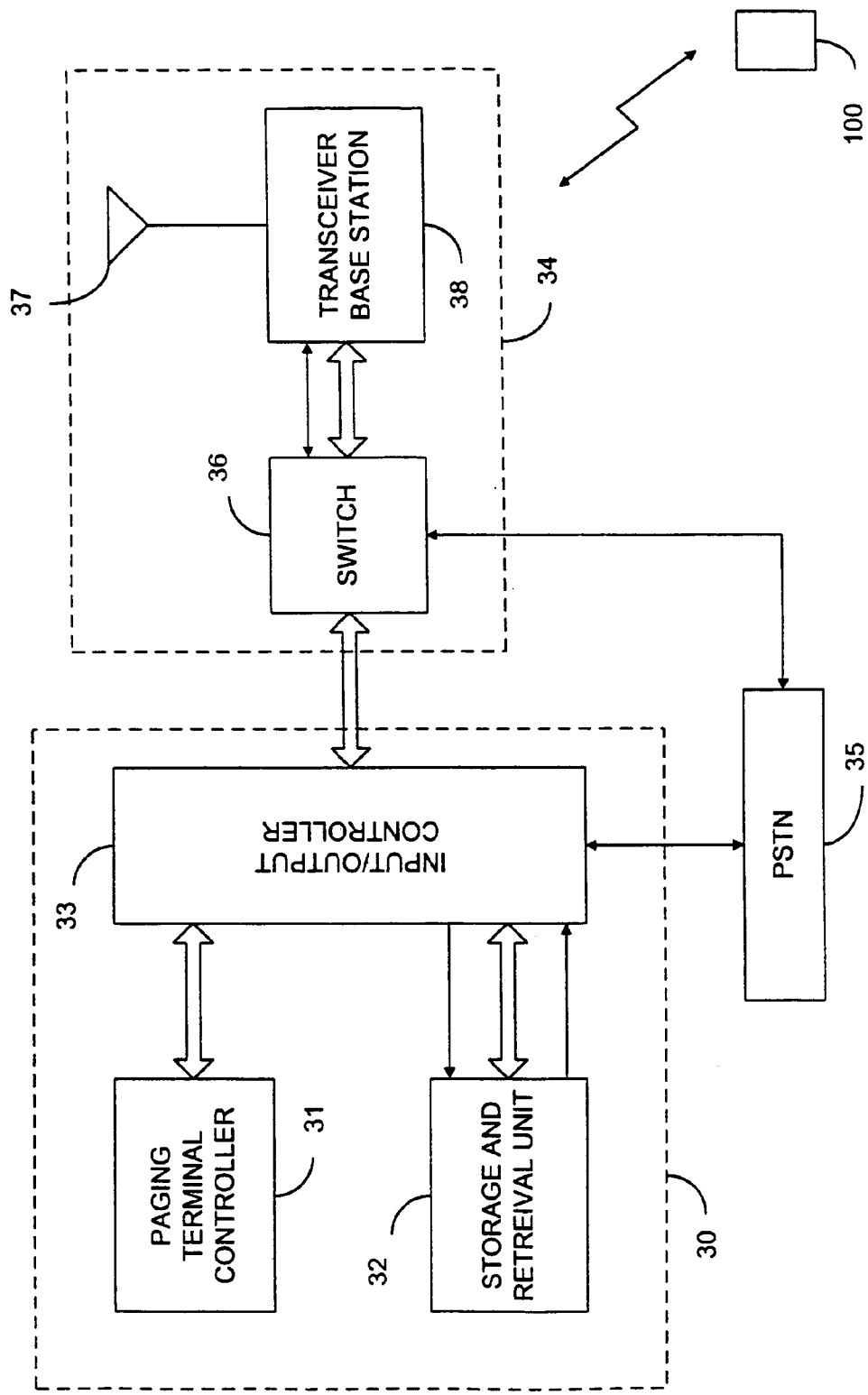
FIG. 3 is a functional block diagram of a remote device according to the preferred embodiment of the present invention which is adapted to store voice messages and other information for access and management by, among other things, user devices such as those shown functionally in FIGS. 1 and 2.

FIG. 3 shows a system 30 interconnected to a base station or remote unit 34. Conventional telephone company or other telecommunications or PSTN equipment 35 communicates with the base station 34 and system 30 in conventional fashion. The system 30 can comprise a paging terminal controller 31 which may comprise a controller circuit and associated memory (not shown) having a database of subscriber listings and corresponding selective call address fields. The paging terminal controller 31 communicates with storage and retrieval unit 32 and correlates messages with subscriber listings. The storage and retrieval unit 32 may comprise appropriate processor or control circuitry, message information and program memory, memory interface circuitry and DSP capacity with appropriate operational code for storage and retrieval of the desired messages. The input/output controller 33 contains all necessary input and output circuitry such as encoders and decoders, modems and required routing and control circuitry (not shown) for communicating with the paging terminal controller 31, the storage and retrieval unit 32, telephone company equipment 35 and base station 34. Such base stations and their components may be conventional.

Figure 4:
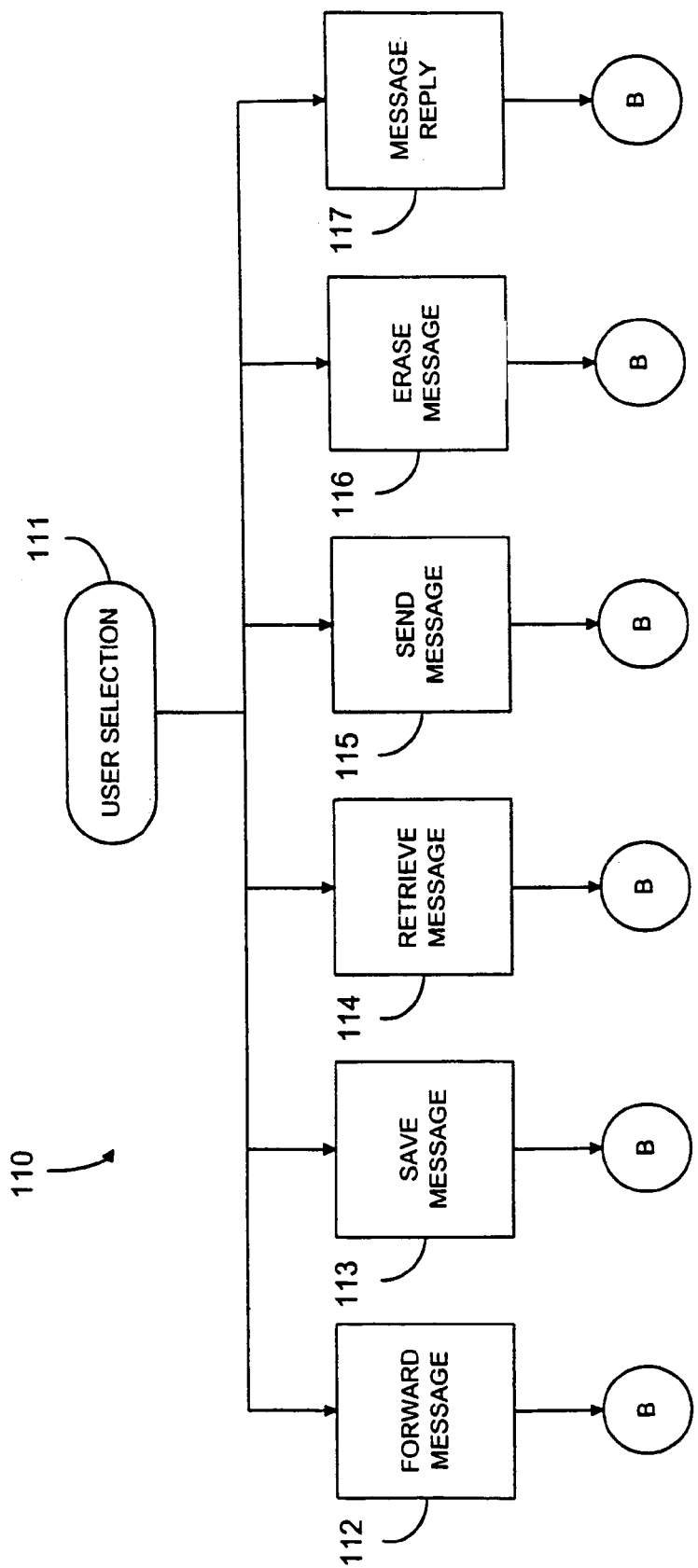
FIG. 4 is a schematic diagram for an interface according to a preferred embodiment of the present invention for accessing and managing messages on a plurality of platforms.

FIG. 4 is a schematic diagram for a preferred embodiment of an interface according to the present invention for user selectable function requests at the paging transceiver 100 in order to access and manage messages. At step 111, the user selects a function to be performed. Flow proceeds to the desired function selected. At step A, messages may be selected by the user to be forwarded to one or a plurality of addresses. Items such as messages and send message lists may be selected by scrolling through the message number or name. Selected messages may reside at the paging transceiver 100 or at the system 30. At step B, a selected message may be saved. At step C, selected messages are retrieved for reproduction and/or storage. At step D, messages may be sent to another or a plurality or recipients such as another paging transceiver 100. At step E, the selected message may be erased. At step F, a reply may be sent to the originator of a selected message.

Figure 5:
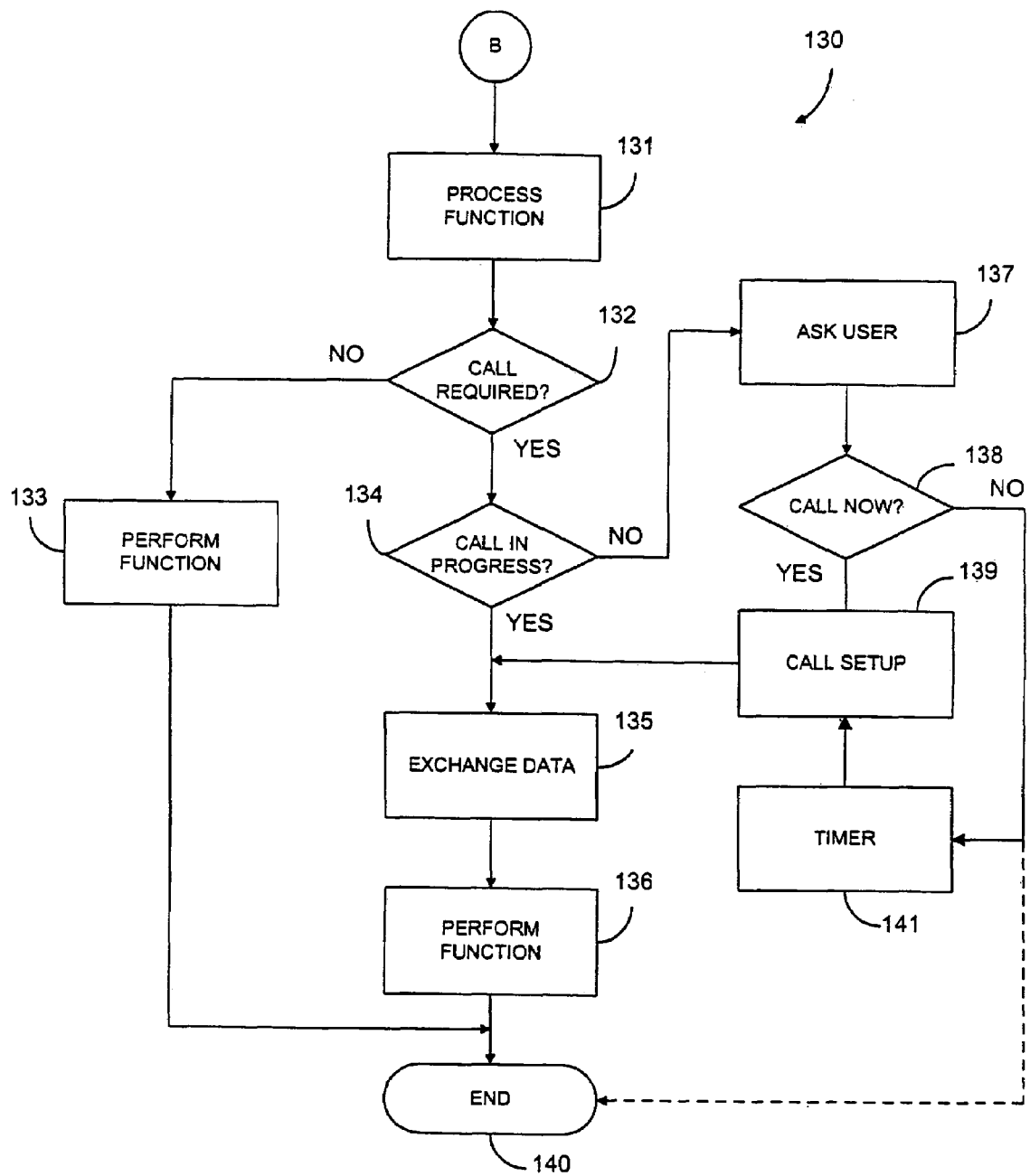
FIG. 5 is a flow diagram of a process according to a preferred embodiment of the present invention for initiating a communications session with a remote device and accessing and managing messages at the remote device and in the user's device.

FIG. 5 shows a flow diagram illustrating one version of process flow to implement functions A-F shown in FIG. 4. When forward message (step A) is selected, flow proceeds to step 131, where CPU 27 reads information pertaining to the message or plurality of messages selected by the user to be forwarded. The information may include a message identifier, location data, message length, message type, destination addresses, or other so-called CI type data. Flow proceeds to step 132 where it is determined whether the message can be forwarded without communicating with the system 30. If so, the appropriate function is performed at step 133 to handle the messages as desired by the user. If not, flow proceeds to step 134 where CPU 27 determines if a call is in progress. If a call is in progress flow proceeds to step 135 where CI data is exchanged with the system 30 for forwarding messages. If the messages to be forwarded are located at the system 30, the messages are simply flagged for forwarding to the appropriate addresses, step 136, and confirmation is communicated to the paging transceiver 100. If the message is not located at system 30, it is transmitted from paging transceiver 100 to system 30 at step 136. The process ends at step 140. If at step 134, it is determined that a call is not in progress, the user is asked if the message should be forwarded now, step 137. If the user selects yes, a call is established with system 30, step 139, and flow continues as previously described. If no, CPU 27 retains the forwarding information in memory for forwarding the message during a subsequent call with system 30 and process ends, step 140.

The paging transceiver 100 and system 30 may exchange status information during messaging calls initiated by the paging transceiver 100 or by selective call (i.e. page calls) initiated by the system 30. The status information may contain information corresponding to messages stored within the paging transceiver 100 or within the system 30. For example, if the system 30 erases a message that has resided in its memory for too long a period of time (i.e. an unsaved, read message) the system 30 may inform the paging transceiver 100 that the message no longer exists. If the message identifier stored in the paging transceiver 100 no longer corresponds to a message stored in the system 30 or the paging transceiver 100, CPU 27 can remove the identifier for the no longer existing message.

In operation, the user selects a message or messages to be forwarded. The user also selects a recipient. If the message resides at the system 30, it is simply forwarded to the addressed recipient. If the message is located in the paging transceiver 100 it is first transmitted to the system 30 before it can be forwarded to the intended recipient. In order to conserve time and resources, the system 30 will preferably not accept receipt of a message from the paging transceiver 100 if the same message already exists at the system 30. The system 30 will simply perform the required function with the already present duplicate message.

Returning now to FIG. 5, if a save message function B is selected flow proceeds to step 131, where the message identifier to be saved is read by CPU 27 and flow proceeds to step 132, where CPU 27 determines if the message identified selected corresponds to a message already stored in message memory 5 and if the selected function can be processed off line. If yes, flow proceeds to step 133, where a save message flag is set by CPU 27 in order to protect the message stored in message memory 54 from being over written and the process ends, step 140. If at step 132, it is determined that the message is not stored at the paging transceiver 100, flow proceeds to step 134, where a determination is made to see if a call is in progress. If a messaging call is in progress, CI data instructing the system 30 to save the message is sent. System 30 flags the stored message and sends a message saved acknowledgment or confirmation signal (Ack) to the paging transceiver 100, step 136. The CPU 27 converts the Ack to status information and informs the user that the message is saved at the system 30. The process ends at step 140. If at step 134, it is determined that the paging transceiver 100 is not currently in communication with the system 30, CPU 27 flags the message identifier for saving and the user is asked if the call should be made now, step 137. If no, step 138, the flag is kept for transmission to system 30 at a later time such as during a selective call to the paging transceiver 100 or during a messaging call to system 30. If yes, flow proceeds to step 139 where a call is set up for transmitting the save flag and CI data as previously described.

Returning now to function C of FIG. 5, if the retrieve message function is selected, flow proceeds to step 131 where message identifiers corresponding to messages to be returned are read from CPU 27 memory for retrieving the message. Additionally, CPU 27 may read message location information, system ID information, address information, message length information, message type information and the like as previously described. Flow proceeds to step 132, where CPU 27 determines where the message is located and if a call to system 30 is required. If the message is stored in message memory 5 of FIG. 1, flow proceeds to step 133, where the message is retrieved. The message may be an audio message, visual message or electronic signal for transferring to another device. At step 132, if the message does not reside in message memory 5, CPU 27 determines that a call is required to retrieve the message and flow proceeds to step 134, where it is determined if a call is in progress. If a call is in progress, flow proceeds to step 135 where CI data is exchanged such as which messages to retrieve, message length, message type, message identifier and the like. Flow proceeds to step 136 where the message is retrieved and simultaneously stored in message memory 5 by DSP 4 of FIG. 1. The appropriate status information corresponding to the message is stored in CPU 27 memory and the process ends. If at step 134 a call is not in progress, the user is asked if the call should be made now or if during another call, step 137. Flow proceeds to step 138 where if the user chooses to place the call now then flow proceeds to step 139 and the call is processed. If the user chooses to delay the call until another session, the message is left flagged for retrieval at the next session and the process ends, step 140. It should be noted that when the user chooses to postpone the call at step 138, a timer 141 may be inserted so that the message may be retrieved at a desired time or a retrieval instruction may be sent from system 30 to paging transceiver 100 for causing the paging transceiver 100 to automatically retrieve a message or plurality of messages at a time designated by system 30. For example, it may be desirable to have emergency weather information automatically retrieved during night time hours when telephone line charges and air time charges are less. The above described options may also be utilized for forwarding messages, erasing messages, saving messages, sending messages and replying to messages as will be shown in more detail hereinafter.

Referring now to the send message function D of FIG. 5: In order to send a message, the message must typically first be stored at the paging transceiver 100 or the system 30. The process of storing or recording messages is conventional. It is only necessary that the stored message be identified, addressed to a recipient and properly identified in accordance with the description of the present invention. Examples of these devices are described in U.S. Pat. No. 4,602,129 to Matthew, et al., (which is incorporated herein by this reference) and U.S. Reissue Pat. Re. 34,976 to Helferich, et al. (which, together with its underlying patent, has been incorporated by reference above). System 30 and paging transceiver of the present invention can be configured to record, store and retrieve a plurality of different types of messages as previously described depending on the application required. Returning to send message function D, when send message function D is selected, flow proceeds to step 131 where the selected message to be sent is identified and cross referenced to the selected recipient address information. Flow proceeds to step 132 and continues through the process in the same manner as forwarding a message, function A. The message to be sent may reside in the paging transceiver 100 or the system 30. If the message resides in the system 30 and the paging transceiver 100, the message in the system 30 corresponding to the CPU 27 message identifier will be sent in order to conserve time. If the message does not reside in system 30, the message will be sent from the paging transceiver 100 to the system 30. If the message is to be sent from the paging transceiver 100, it may be a pre stored message or alternatively, the message may be transmitted to system 30 by paging transceiver 100 in real time during a call session between system 30 and paging transceiver 100.

Referring now to erase message function E of FIG. 5, the erase message function allows a user to erase messages stored at the system 30 or at the paging transceiver 100 depending on the mode of operation. Given that a message may be erased without erasing the message identifier, if a message is erased at the paging transceiver and the identifier still exists, the message can be retrieved from the system 30. In order to remove a message identifier at the paging transceiver 100, the message must be erased at the system 30. At step 131, the selected message to be erased is identified and the user is asked if the selected message in the paging transceiver is to be erased or if both copies of the message are to be erased. If the local message only is selected to be erased, the message identification information is retained and flow proceeds to step 133 where the message stored in memory 5 of FIG. 1 is flagged for erasure or overwriting. In other words, the message still exists but may be over written by another message when memory space is required. The message may be retrieved from message memory until it is over written. If at step 132, a decision was made to erase both copies of the message, flow proceeds to step 134 where CPU 27 determines if a call is in progress. If yes, flow proceeds to step 135, where CI data is exchanged instructing system 30 to erase the message. Flow proceeds to step 131 where system 30 transmits an Ack that the message was erased, CPU 27 flags the local message for erasure, the identifier is removed and both copies of the message and the identifiers are erased. If at step 134, it is determined that a call is not in progress, flow proceeds to step 137, where the local message is erased and the user is asked if the system 30 copy of the message needs to be erased now. If yes, flow proceeds to step 139, the call is established and the process continues as previously described. If no, the necessary flags are set for erasing the remote message during the next communication with system 30. Again, timer option 141 may be utilized for a timed erase of the message stored at system 30.

Referring now to message reply function F of FIG. 5, the reply message function F is for sending a reply to an already received message. A reply message utilizes the same process as a send message except that a return address is already correlated to the message designated for reply. During send message function D the user is required to select an address or destination for the message to be sent. In other words, the user must know the destination or address in advance. Message reply function F does not require that the user know the address of the recipient because the message being replied to has a corresponding return address. Just like send message function D, a reply message may be sent in real time or it may be prerecorded and stored in the paging transceiver 100 for transmission to system 30. Additionally, the replay transmission may be delayed for a set period of time as previously described.

The common user interface of the present invention serves to control functions at the paging transceiver 100 and/or corresponding functions of system 30, (i.e. a remote device), depending on the location of a message and the communications status of the paging transceiver 100.

Figure 6:
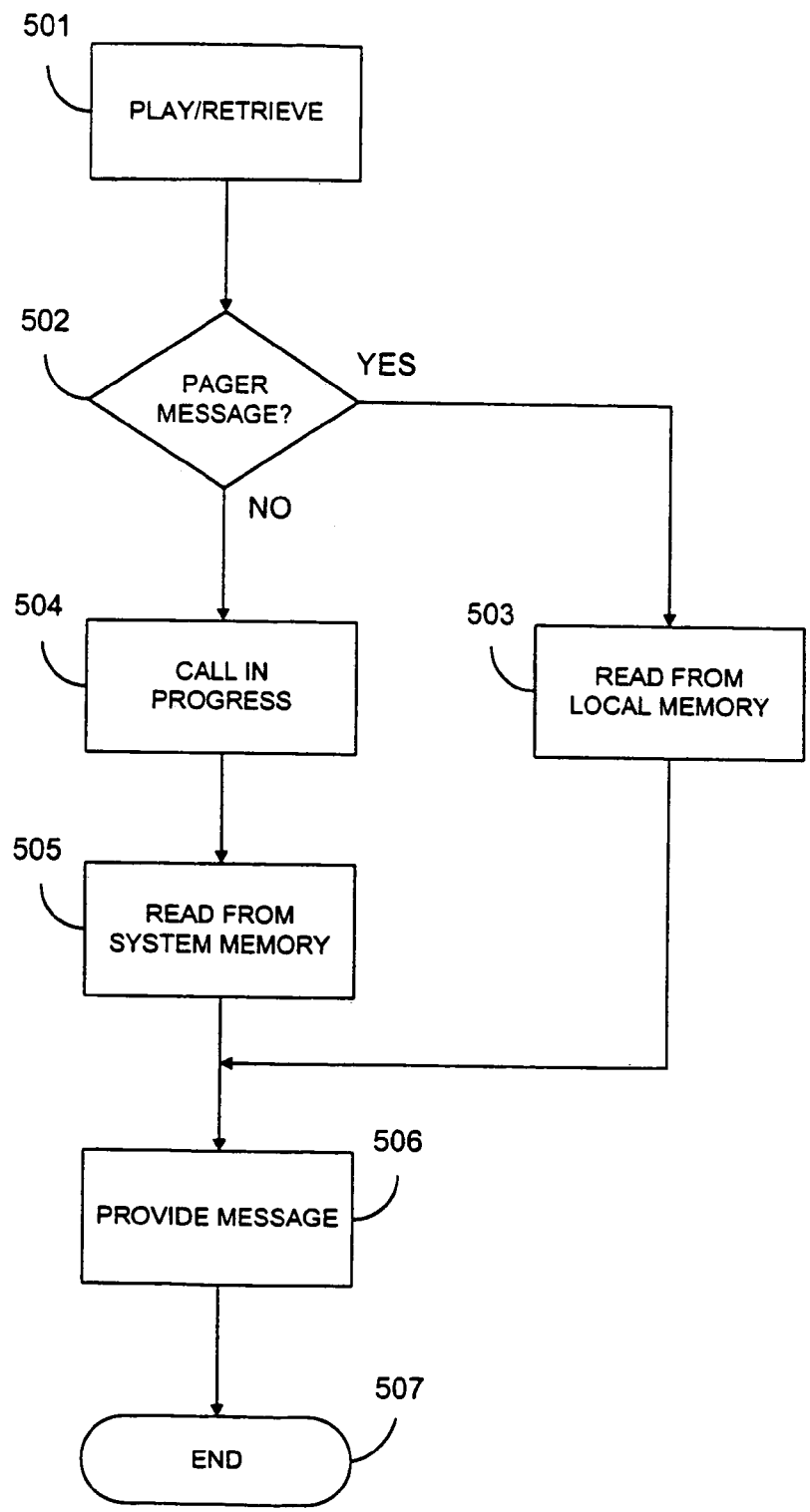
FIG. 6 is a flow diagram of a process according to a preferred embodiment of the present invention for playing and/or retrieving messages.

FIG. 6 shows process flow for when the user of devices such as paging transceiver 100 wishes to play a selected message (i.e. a message from John Doe). The operator simply presses keys or otherwise manipulates or actuates the interface in a manner to cause the interface to recognize a "play" input, step 501. This can occur via any man/machine interface components which feature appropriate properties, including appropriate look and feel, structure, cost, compatibility with electronic and structural environment and convenience. Such components can, for instance be conventional keypad, single dimension or multi dimension mouse coupled to an appropriate screen, buttons, voice actuated, or other components. Flow proceeds to step 502 where CPU 27 determines if the message identifier information selected corresponds to a message stored at the paging transceiver 100. If yes, flow proceeds to step 503 where the message is read from message memory 5 and the message is played. If at step 502 the result is no, flow proceeds to step 504 where if the paging transceiver 100 is on line flow proceeds to step 506. If it is not, the call process is activated to go on line as previously described and flow proceeds to step 506 where the message is read from store and retrieval unit 32 and played for the operator while the message is simultaneously stored in paging transceiver 100 message memory 5. The process ends at step 507.

Figure 7:
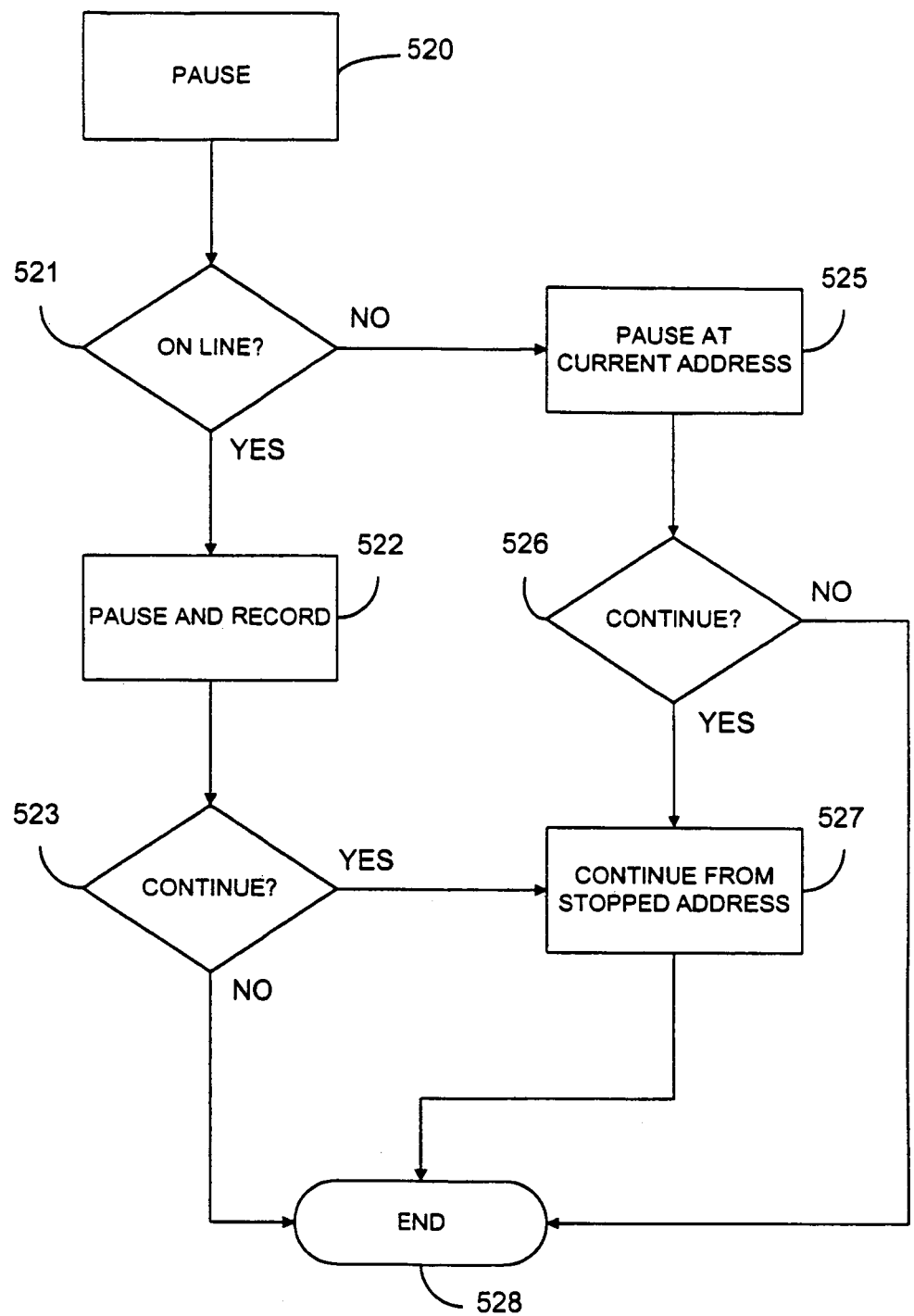
FIG. 7 is a flow diagram for a process according to a preferred embodiment of the present invention for pausing while playing messages.

FIG. 7 shows process flow for when a message is playing and the user wishes to use the interface to create a 'pause,' step 520. Flow proceeds to step 521 where a test is made to determine if the message is being played. If the message is playing from system 30, flow proceeds to step 522 where the message that the operator hears is paused while the message continues to be recorded in paging transceiver 100 message memory 5. Flow proceeds to step 523 where CPU 27 determines if the operator released the pause function. If not, the paging transceiver remains in pause mode (i.e. muted) and the process ends, step 524. If at step 523 the operator releases the pause button, flow proceeds to step 527 where the message begins to play from the location in memory from which pause was last pressed. The process ends at step 528. If at step 521, it is determined that the message is playing from message memory 5, flow proceeds to step 525 where playing of the message is suspended and flow proceeds to step 526 where a test is made to determine if the operator released the pause button. If no, the process ends, step 529. If yes, the message begins to play from the last paused address and the process ends at step 528.

Figure 8:
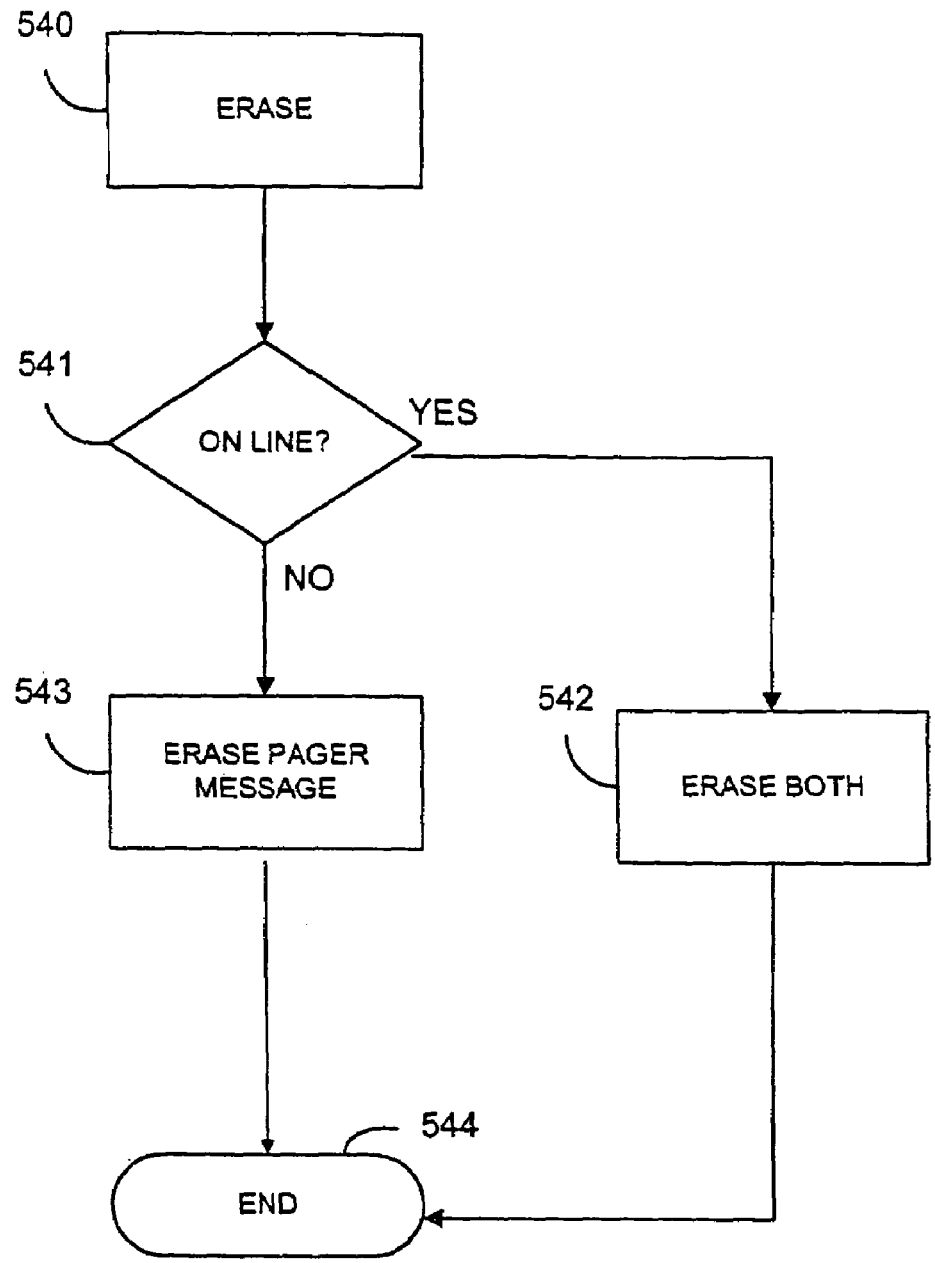
FIG. 8 is a flow diagram for a process according to a preferred embodiment of the present invention for erasing messages.

FIG. 8 shows process flow for when the user wishes to 'erase' messages using the interface. CPU 27 determines if the paging transceiver is on line or off line, step 541. If off line, flow proceeds to step 543 where the selected message is erased and the process ends, step 544. If at step 541, it is determined that the paging transceiver 100 is on line, the selected message at the paging transceiver (if any) and the corresponding message at the system 30 are both erased and the process ends, step 544.

Figure 9:
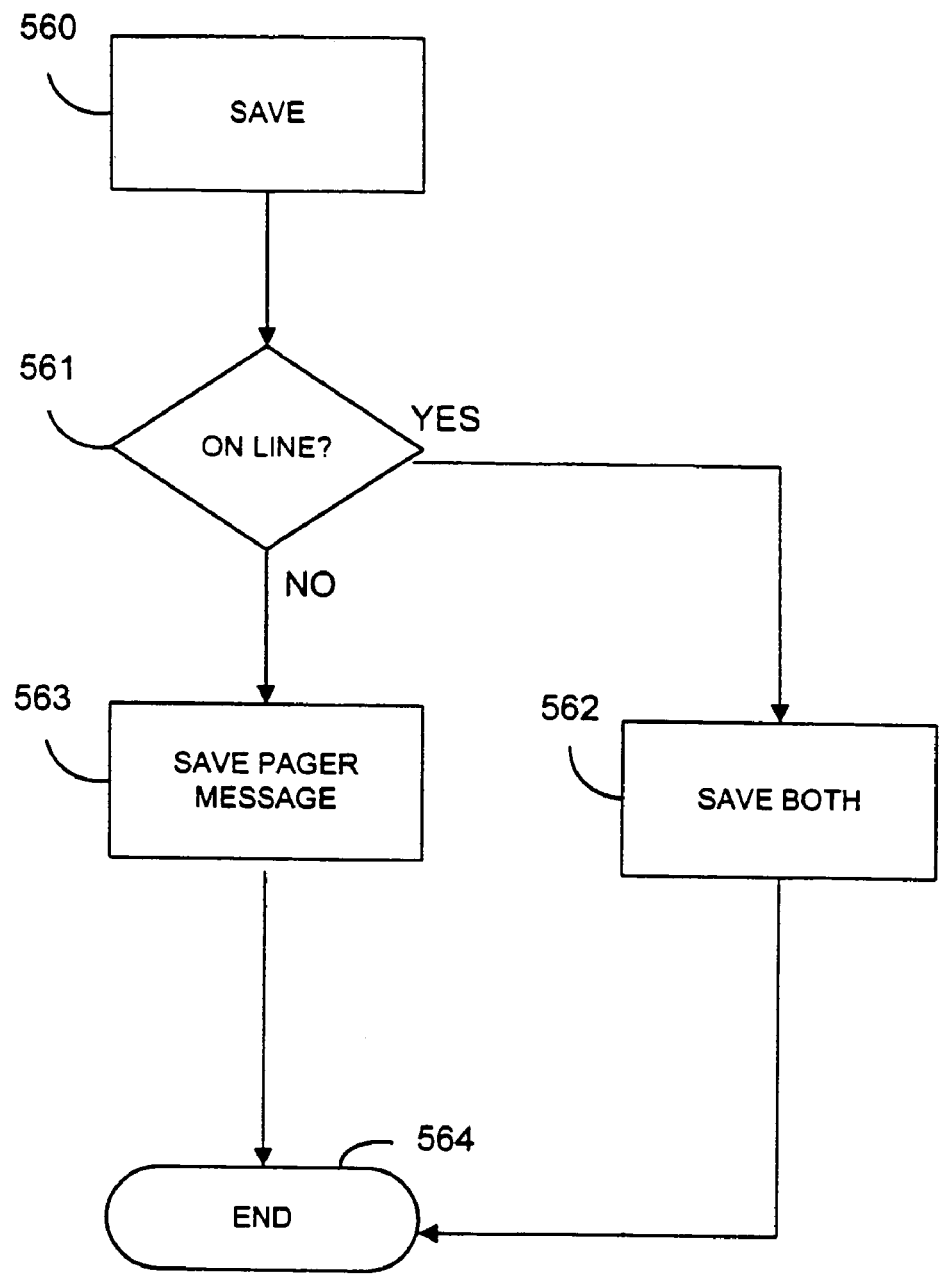
FIG. 9 is a flow diagram for a process according to a preferred embodiment of the present invention for saving messages.

FIG. 9 shows process flow where the user desires to 'save' messages. At step 560, flow proceeds to step 561 where it is determined if the paging transceiver 100 is on line or off line. If off line, a save message flag is set which corresponds to any selected message which may reside in the paging transceiver 100, step 563. If on line, flow proceeds to step 562 where the selected message is saved at the paging transceiver 100 (if any) and the system 30. If at step 562 the selected message does not reside at the paging transceiver 100, it will be retrieved from the system 30 and saved at both locations. The process ends at step 564.

Similar process flow may be implemented for other functionality which is desired in access and management of messages according to the present invention.

The foregoing disclosure is provided for purposes of explanation and illustration of various embodiments and features of the invention. Modifications and changes may be made to the disclosed subject matter without departing from the scope or spirit of the invention.

What is claimed is:

1. A device for allowing a user to access audio information stored in a plurality of locations using a single interface, comprising:
   a transceiver to communicate with at least one remote storage system adapted to store audio information;
   memory capacity adapted to store audio information;
   a processor associated with said transceiver and said memory capacity, said processor adapted to control operation of said transceiver and said memory capacity; and
   an interface associated with said processor, said interface adapted to be manipulated by said user and adapted to provide signals to said processor for causing said processor to access audio information stored in said memory capacity and/or in said at least one remote storage system, wherein said interface is further adapted to control a process that plays said audio information stored in said memory capacity upon actuation of said interface by said user, and is further adapted to control a process that automatically plays said audio information stored in said at least one remote system, and said process that plays said audio information stored in said at least one remote system automatically accesses and plays said audio information when said transceiver is on-line with said at least one remote system, and when not on-line, automatically initiates a communication session with said at least one remote system in order to access and play said audio information stored on said at least one remote system.

2. The device of claim 1, wherein said interface is configured to enable said user to input a command to pause audio information that is being played.

3. The device of claim 2, wherein said processor is programmed to perform a procedure in response to said user inputting said pause command, said procedure comprising the step of pausing the playing of said audio information while receiving said audio information from said remote storage system.

4. The device of claim 1, further comprising a transmit/receive antenna connected to the transceiver.

5. The device of claim 4, further comprising a microphone, a speaker, and a keypad.

6. In a device including a memory for storing audio information, a transceiver for communicating with a remote system, and an interface that allows a user of the device to select audio information and a function to be performed on the selected audio information, a method comprising the steps of:
   receiving from the user an input specifying a function to be performed on said selected audio information;
   reading from the memory information pertaining to the audio information selected by the user;
   determining whether said function can be performed without communicating with the remote system; and
   performing said function if it is determined that said function can be performed without communicating with the remote system, and, if it is determined that said function cannot be performed without communicating with the remote system, then performing the steps of:
      determining whether a connection is currently established between the transceiver and the remote system;
      automatically establishing a connection with the remote system if it is determined that a connection is not currently established between the transceiver and the remote system; and
      transmitting a command message to the remote system so that the remote system can perform said function on said selected audio information.

7. The method of claim 6, wherein the command message transmitted to the remote system includes an audio information identifier that is used to retrieve the selected audio information.

8. The method of claim 7, further comprising the step of receiving the audio information from the remote system after transmitting the command message to the remote system.

9. The method of claim 8, further comprising the step of playing the audio information as it is received from the remote system.

10. The method of claim 9, further comprising:
   receiving an indication that the user wants to pause the playing of the audio information; and in response to receiving the indication, pausing the playing of the audio information while still continuing to receive the audio information from the remote system.

11. A device, comprising:

transmitting and receiving means for communicating with a remote system having access to stored audio information;

a memory for storing audio information;

a user interface for enabling a user of the device to select certain stored audio information and a function to be performed on the selected audio information; and a processor means for performing a process in response to the user selecting certain stored audio information and a function to be performed on the selected information, the process comprising the steps of:

determining whether a connection is currently established between the transmitting and receiving means and the remote system;

automatically establishing a connection with the remote system if it is determined that a connection is not currently established; and transmitting information to the remote system so that the remote system can perform the function on the selected audio information.

12. The device of claim 11, wherein the information transmitted to the remote system includes an audio information identifier that is used to retrieve the audio information.

13. The device of claim 12, wherein the information transmitted to the remote system further includes a system identifier that is used with the information identifier to retrieve the audio information.

14. The device of claim 12, wherein the process further comprises the step of receiving the audio information from the remote system after transmitting the information to the remote system.

15. The device of claim 14, wherein the process further comprises the step of playing the audio information as it is received from the remote system.

16. The device of claim 15, wherein the process further comprises the steps of:

receiving an indication that the user wants to pause the playing of the audio information; and in response to receiving the indication, pausing the playing of the audio information while still continuing to receive the audio information from the remote system.

17. A messaging device, comprising:

a radio transceiver for communicating, by means of a radio frequency link, with a remote storage system adapted to store a plurality of audio information;

a memory;

a user interface for enabling a user to input a command to play selected audio information stored in said remote storage system;

means, responsive to the user inputting said command, for determining if said audio information to be played is stored in said memory;

means for reading said audio information from said memory if said audio information is stored therein;

means for automatically establishing a connection with said remote storage system if a connection is not already established and if said audio information is not stored in said memory;

means for receiving said audio information from said remote storage system by means of said radio transceiver after said means for automatically establishing a connection with said remote storage system establishes a connection with said remote storage system; and means for playing said audio information for said user.

* * * * *